No. 781,878. Patented February 7, 1905.

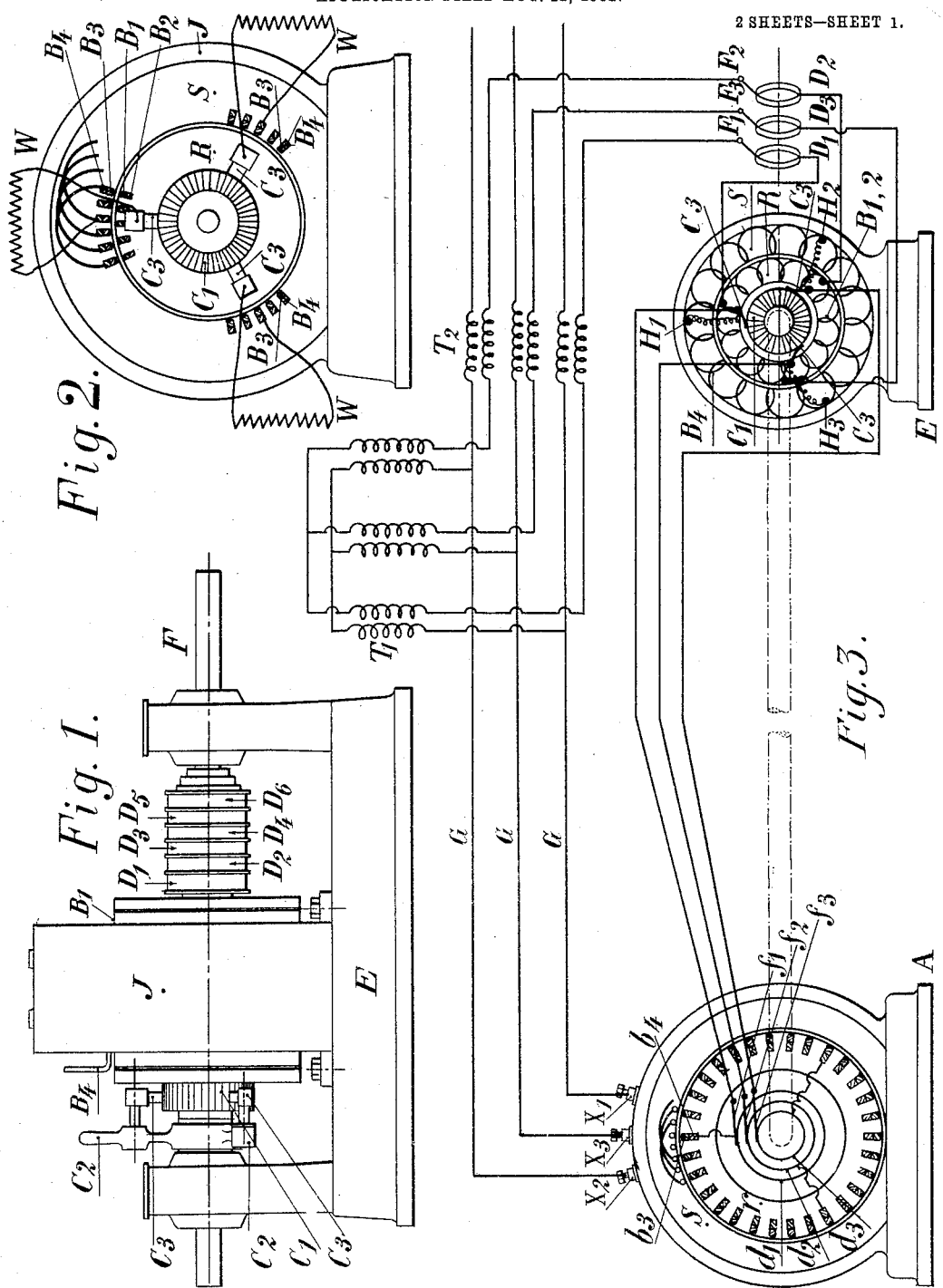

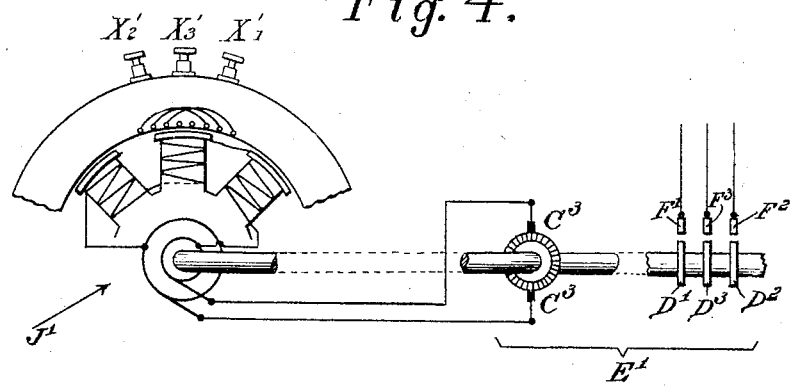

UNITED STATES PATENT OFFICE.

HENRI AMÉDÉE EMILE HARLÉ, OF PARIS, FRANCE.

DYNAMO-ELECTRIC MACHINE.

SPECIFICATION forming part of Letters Patent No. 781,878, dated February 7, 1905.

Application filed August 12, 1902. Serial No. 119,379.

*To all whom it may concern:*

Be it known that I, HENRI AMÉDÉE EMILE HARLÉ, a citizen of the Republic of France, residing at Paris, France, have invented a new and useful Improvement in Dynamo-Electric Machines, which improvement is fully set forth in the following specification.

The machine herein described is characterized by the use of a rotor similar to that of a rotary converter provided with a commutator and combined with a special stator carrying two windings, the one of closed turns and the other fed by a current collected by means of brushes from the commutator of the rotor. There is collected from the commutator of the rotor not a single continuous current, but a system of continuous or slow alternating currents which possess the properties of a system of polyphase alternating currents of low frequency.

Figures 1 and 2 show diagrammatically the construction of the novel polyphase machine as most generally used and which comprises four different circuits, two on the stator and two on the rotor. Fig. 1 is a longitudinal elevation; Fig. 2, a transverse elevation taken on the side of the collector, the bearing being removed. Fig. 3 is a diagrammatic view of an alternator and exciter therefor. Fig. 4 is a diagrammatic view of another type of alternator and an exciter therefor.

The rotating armature or rotor R carries in notches a winding B′, similar to that of a continuous-current dynamo and terminating in the commutator C′, and a second winding $B^2$, similar to that of an alternator or a simple or polyphase alternating-current motor, terminating in two or $n$ insulated rings ($n$ being the number of phases) $D'$ $D^2$, &c., which are keyed to the shaft. Three or more brushes $C^3$, set at equal angles with respect to the winding, bear on the commutator C′ in such a manner as to be able to deliver a system of polyphase alternating currents when a magnetic field is rotated around the rotor. The three or $n$ brushes are carried by a common collar $C^2$, from which they are insulated and which allows them to be moved simultaneously without altering their respective angles. The stator S, supported on a fixed casing J, carries two windings, the one, $B^3$, of closed turns similar to those of an asynchronous motor-armature, the other, $B^4$, bobbined as an inductor-winding of a polyphase motor and provided with a number of phases corresponding to the number of phases of the brushes $C^3$. The winding $B^4$ is an inductor-winding and is fed with three or $n$ currents by connecting its ends, respectively, to the brushes $C^3$ in such a manner that if a magnetic field be rotated around the rotor the polyphase currents furnished by the brushes to the winding $B^4$ of the stator will generate in it a field rotating with the same speed. Such is the machine in its most complex form; but in its applications it may be simplified by omitting one of the two windings of the stator or rotor or even both windings of the stator, as will be seen farther on on examination of the different applications of the said machine. It will be seen, in effect, that it may work, as desired, as a synchronous or asynchronous generator, a rotary converter, or an exciter.

*Its use as a motor.*—Suppose that the rotor is fed through the rings D by an arrangement of polyphase currents corresponding to the number of phases of its winding $B^2$. The rotating field generates induced currents in the winding $B^3$ of the stator, and the machine puts itself in motion as an asynchronous motor. The brushes $C^3$ collect polyphase currents the frequency of which is equal to that of the slip and which transmitted to the winding $B^4$ generates an inductor-field rotating at the same speed as that of the first field. By adjusting the position of the group of brushes and altering, if required, the intensity of the currents transmitted to the winding $B^4$ by interpolated rheostats or induction-coils W one may do away with or decrease more or less the phase of the current with respect to the tension in the feed-circuit $B^2$. The motor may attain synchronism and remain in synchronism, for when the speed of rotation of the induced field becomes *nil* the currents of low frequency delivered by the brushes $C^3$ become merely continuous currents.

*Use as a generator.*—If the shaft of the said machine be rotated by a mechanical motor, it excites itself by means of the continuous currents collected by its brushes just as any self-excited alternating-current dynamo does and becomes capable of delivering, through the circuit $B^2$, alternating currents, which are taken from the rings D. In this use, as in the preceding, if the currents in the circuit $B^2$ are only monophase the winding $B^3$ will furnish by induction a complemental field at an angle of $\pi/2$ with respect to that produced by $B^2$ in such a manner that the resultant magnetic field will still be a magnetic field rotating just as if polyphase currents were in question. The generator is thus capable of asynchronous working—that is to say, it may be made to work in parallel with other machines without its speed synchronizing with the speed of the latter, for the currents delivered by the brushes $C^3$ to the inductor-circuit, which have a frequency equal to that of the slip, give rise to an induced field which moves with a corresponding speed in the stator and which induces in the rotor currents of the same frequency as those of the other alternators with which it works in parallel.

*Use as a rotary converter or frequency-transformer.*—If when the machine has been started as a motor by feeding its rings D with mono or polyphase alternating currents its brushes $C^3$ connected to the work-circuits at the same time as they continue to feed the circuit $B^4$ in series or in derivation, the transformation of alternating currents into currents of lower frequency is effected or even into currents of no frequency if there be synchronous working. The machine is therefore a true transformer having multiple functions—viz., a transformer of frequency in the first case and a transformer of alternating current into continuous currents in the second case. An interesting application of this property may be exemplified by its application to the braking of the machine when used as an induction-motor. It is sufficient at the required moment to break the connection between the terminals of the inducing-circuit and the line and to connect said terminals and the brushes $C^3$ of the commutator. The currents thus supplied to the inducing-circuit set up a field which quickly slows down the rotor. It is obvious that the inducing-circuit of the motor may be a winding carried by either the rotor, as shown, or the stator. In this use, as in the preceding, sparking at the brushes is reduced or prevented by the presence of the closed turns of the winding $B^3$, and, if that be not sufficient, by some of the well-known devices employed in all apparatus in which it is desired to prevent sparking due to the extra currents at rupture.

*Use as an exciter for alternators.*—The properties above indicated for the machine working as a generator can be immediately extended to its use as exciter for an alternator by giving to the alternator a fixed or rotating inductor with windings similar to those of the stator of the dynamo above described and feeding it with currents taken from the brushes of a similar exciter-dynamo connected to the alternator and serving to commute current derived from the terminals of the alternator either directly or when transformed by known means. Fig. 3 shows the arrangement with greater clearness, but of course diagrammatically. A is the alternator; E, the exciter, keyed upon the same shaft. If both machines be provided with the same number of poles, they may be driven synchronously by gearing or by a synchronous motor. $s$ and $r$ are respectively the stator and rotor of the alternator. The rotor is here supposed to play the part of the inductor; but the parts may be inverted. The armature $s$ carries the ordinary winding of an alternating-current machine and is connected by terminals $X'$ $X^2$ $X^3$ to the line-wires G. $T'$ and $T^2$ are transformers placed, respectively, in a derived circuit and in series upon the said conductors. They have the same number of phase-windings as there are phases, (except in the case of the Scott transformers, which are not of interest.) The secondary circuits of the transformers, which are connected, respectively, in series, as in several known arrangements of compound alternators, terminate in brushes $F'$ $F^2$ $F^3$, &c., which press upon the rings $D'$ $D^2$ $D^3$ of the dynamo which plays the part of an exciter. The other letters of the dynamo indicate the same parts as before, but one of the two rotor-windings $B'$ $B^2$ being shown. The dynamo has the effect of a rotary converter and transforms the polyphase currents thus received into continuous or slow alternating currents, which are collected at the brushes $C^3$ of the commutator $C'$. A portion of the currents from the brushes $C^3$ (or all if E be excited in series) serve to excite the inductor-circuit $B^4$ of the stator S, (the circuit $B^3$ is not shown for the sake of simplicity,) and the rest feed the inductor $r$ of the alternator. The inductor $r$ carries one or two windings $b^3$ $b^4$, similar to the windings $B^3$ or $B^4$ of the exciter. The first, $b^3$, is a closed winding and serves for the asynchronous working and the equalization of the rotating field. The second, $b^4$, is a polyphase exciting-circuit fed with currents taken from the brushes $C^3$ of the exciter, the said currents being in the case shown transmitted to the winding by brushes $f'$ $f^2$ $f^3$ and rings $d'$ $d^2$ $d^3$. The working is as follows: The machine E generates in the inductor $r$ of the alternator exciting ampere-turns nearly proportional to the tension of the alternating currents furnished to the brushes $F'$ $F^2$ $F^3$. One may thus by altering the proportions of the windings of the transformers $T'$ and $T^2$ obtain the self-excitation of the alternator in series in a derived circuit and in compound and in this latter case compound all the effects of the action of the armature not only in magnitude, but in phase displacement, because the poles of the inductor lag of themselves when the relative values of the currents derived from the commutator change under the effect of the change of phase of the alternating currents led to the rings $D'$ $D^2$ $D^3$. The conditions of excitation may be altered by altering the angle of the group of brushes $C^3$. The conditions of compounding may be altered by omitting or lessening the transformer $T'$ in the derived circuit or the exciter-winding $B^4$, for the effect of these two parts supplement each other in a large measure. The winding $B^3$ also may be done away with when it is not necessary to deaden the variations of the field. In the same way the short-circuited winding of the inductor of the alternator is not absolutely necessary. As in the working of the polymorphous dynamo as a generator its asynchronous working is as easy as its synchronous working—that is to say, the alternator may work in parallel with the others at a quite different speed—because the speed of rotation is increased or lessened correlatively to the relative speed of the inductor-field with respect to the rotor, which (if the connections are properly made) reëstablishes the same speed of pulsation as in the other alternators. In asynchronous working the short-circuited windings $B^3$ and $b^3$ contribute in variable proportion to the production of the inductor-fields of the two machines. It is to be remarked that the variations of phase of the currents feeding the inductor-circuit $b^3$, for example, are accompanied by an alteration of the total ampere-turns resulting according to a known law. In order to lessen the variation as much as possible, it is well to employ windings of six phase or more rather than of three or four only. The closed windings $B^3$ $b^3$ are not absolutely necessary and may be done away with in certain cases. They may, moreover, undergo several modifications. For example, the rotor-winding $b^3$ may be omitted. The stator of the alternator may be used as the inductor. The winding $B^3$, or even both windings $B^3$ $B^4$, may be omitted. The rotor may have but one winding connected to both the collector-rings $D'$ $D^2$, &c., and to the brushes $C^3$. In all cases the main feature remains the same—viz., the production in a commutator and the use of polyphase currents of very low frequency coming down at zero frequency to a system of continuous currents of different tension capable of inducing poles in a polyphase winding as polyphase currents themselves.

*Modification in the inductor of the alternator excited by a machine of my construction.*—Instead of a uniformly-wound inductor-winding a winding in poles may also be employed either by putting as many polar protuberances as the exciter has phases, or, again, and more simply, by employing an inductor system of one of the usual types employed for synchronous alternators. In this case the three or $n$ brushes of the commutator of the exciter are replaced by two brushes only. This construction is diagrammatically shown in Fig. 4, in which the alternator $J'$ has a revolving field energized by current taken from the exciter $E'$ by means of two oppositely-placed commutator-brushes $C^3$, the exciter being driven by current received from the alternator through the brushes $F'$ $F^2$ $F^3$ and the rings $D'$ $D^2$ $D^3$. The exciter will then only alter the tension of the current exciting the inductors, and consequently vary only the inductor ampere-turns and not their lag, as in the preceding case.

I claim—

1. A dynamo-electric machine, comprising a stator and a rotor, said rotor provided with terminals for polyphase current and a commutator, independent, stationary commutator-brushes equal in number to the phases which the machine is arranged to receive or deliver, and an external lead from each of said brushes.

2. A dynamo-electric machine, comprising a stator and a rotor, one of which is provided with a primary winding for alternating currents and the other with a secondary winding in inductive relation to said primary winding, the rotor having terminals for alternating currents and a commutator, and a plurality of independent commutator-brushes.

3. A dynamo-electric machine, comprising a stator and a rotor, one of which is provided with a primary winding for polyphase currents and the other with a secondary closed winding in inductive relation to said primary winding, the rotor having terminals for polyphase current and a commutator, and independent commutator-brushes equal in number to the phases of current which the machine is arranged to receive or deliver.

4. A dynamo-electric machine, comprising a rotor, a winding or windings on said rotor provided with rings to receive polyphase currents of given frequency and a commutator and brushes to deliver currents of lower or zero frequency, and a stator in inductive relation to the rotor so that a rotating field is set up in the stator by the polyphase currents received by the rotor.

5. A dynamo-electric machine, comprising a stator having a winding, a rotor provided with rings for polyphase current of given frequency and a commutator, and independent stationary commutator-brushes equal in number to the phases of current which the rotor is arranged to carry.

6. A dynamo-electric machine, comprising a stator, and a rotor having independent windings, one of said rotor-windings having terminals for polyphase current of given frequency and the other rotor-winding having a commutator to deliver currents of lower or zero frequency, and independent stationary commutator-brushes equal in number to the phases of current which the rotor is arranged to carry.

7. A dynamo-electric machine, comprising a rotor provided with rings for polyphase currents of given frequency and a commutator and brushes to deliver currents of lower or zero frequency, and a stator having a secondary winding in inductive relation to the rotor so that a rotating field is set up in the stator by the polyphase currents in the rotor.

8. A dynamo, comprising a stator having an inductor-winding, a rotor provided with ring terminals for polyphase currents and a commutator, and a plurality of independent commutator-brushes connected to different points of the stator-winding.

9. A dynamo, comprising a stator having an inductor-winding, a rotor provided with ring terminals for polyphase currents and a commutator, and independent commutator-brushes equal in number to the phases of current which the rotor is arranged to receive or deliver, connected to different points of the stator-winding.

10. A dynamo, comprising a stator having an inductor-winding and a closed winding, a rotor provided with ring terminals for polyphase currents and a commutator, and a plurality of independent commutator-brushes connected to different points of the stator-winding.

11. A dynamo, comprising a stator having an inductor-winding and a closed winding, a rotor provided with ring terminals for polyphase currents and a commutator, and independent commutator-brushes equal in number to the phases of current which the rotor is arranged to receive or deliver, connected to different points of the stator-winding.

12. A dynamo, comprising a stator having an inductor-winding, a rotor provided with ring terminals for polyphase currents and a commutator, a plurality of independent commutator-brushes connected to different points of the inductor-winding, and a resistance between said brushes and inductor-winding.

13. A dynamo, comprising a stator having an inductor-winding, a rotor provided with ring terminals for polyphase currents and a commutator, independent commutator-brushes equal in number to the phases of current which the rotor is arranged to receive or deliver, connected to different points of the inductor-winding, and a resistance between said brushes and inductor-winding.

14. A dynamo, comprising a stator having an inductor-winding and a closed winding, a rotor provided with ring terminals for polyphase currents and a commutator, a plurality of independent commutator-brushes connected to different points of the inductor-winding, and a resistance between said brushes and inductor-winding.

15. A dynamo, comprising a stator having an inductor-winding and a closed winding, a rotor provided with ring terminals for polyphase currents and a commutator, independent commutator-brushes equal in number to the phases of current which the rotor is arranged to receive or deliver, connected to different points of the inductor-winding, and a resistance between said brushes and inductor-winding.

16. The combination of an alternating-current dynamo having a stator and a rotor, one of which is provided with an inductor-winding and the other with a generator-winding, an exciter having a stator and a rotor, one of which has a winding connected to the generator-winding of said dynamo and the other an inductor-winding, an exciter rotor-winding having a commutator, and independent commutator-brushes equal in number to the phases of current delivered by said dynamo and connected to the inductor-windings of the exciter and dynamo.

17. The combination of an alternating-current dynamo having a stator and a rotor, one of which is provided with an inductor-winding and a closed winding and the other with a generator-winding, an exciter having a stator and a rotor, one of which has a winding connected to the generator-winding of said dynamo and the other an inductor-winding, an exciter rotor-winding having a commutator, and independent commutator-brushes equal in number to the phases of current delivered by said dynamo and connected to the inductor-windings of the exciter and dynamo.

18. The combination of an alternating-current dynamo having a stator and a rotor, one of which is provided with an inductor-winding and a closed winding and the other with a generator-winding, an exciter having a stator and a rotor, one of which has a winding connected to the generator-winding of said dynamo and the other an inductor-winding and a closed winding, an exciter rotor-winding having a commutator, and independent commutator-brushes equal in number to the phases of current delivered by said dynamo and connected to the inductor-windings of the exciter and dynamo.

In testimony whereof I have signed this specification in the presence of two subscribing witnesses.

HENRI AMÉDÉE EMILE HARLÉ.

Witnesses:
  AUGUSTE RATEAU,
  EDWARD P. MACLEAN.